INVENTOR
CHIN JUNG CHENG
BY

ATTORNEY 3,414,963
FRICTION WELDING CERAMIC TO METAL
Chin Jung Cheng, Norwalk, Conn., assignor, by mesne assignments, to Caterpillar Tractor Co., Peoria, Ill., a corporation of California
Filed July 10, 1963, Ser. No. 293,934
2 Claims. (Cl. 29—470.3)

This invention relates in general to friction welding and, more particularly, to the friction welding of metals to ceramics. The term "ceramic" includes, for example, porcelain, graphite, carbon, vitreous materials such as glazed porcelain and glass, and other refractories containing oxides such as aluminum oxide, mixed oxides such as zirconium silicate, carbides, such as titanium carbide, borides, nitrides, intermetallics and sulfides such as nickel aluminide, and rare earth compounds such as samarium oxide. The term "metal" includes single metals and alloys.

In general, the ceramics melt at higher temperature than metals, so that molten metal resulting from frictional heat is believed to penetrate the porous ceramic material to form a metallic seal or bond.

Elements formed by friction welding a ceramic, such as aluminum or magnesium oxide, to a metal, such as aluminum, magnesium, or their alloys, find many new and unique applications. For example, in atomic reactors, metal rods having refractory tips which will withstand elevated temperatures may be used as high temperature probes. Refractory tips on metal rods may also be inserted into high velocity wind tunnels to successfully withstand the intense heat generated by rapidly moving air and gas streams. Ceramic materials may even be friction welded to metal rods to be used as cutting tools for machine shop purposes. Electrical components such as insulators may be made by friction welding a metal to a ceramic.

It is, therefore, a main object of this invention to provide a method whereby a ceramic material may be friction welded to a metal element. It is also an object to provide an article comprising a ceramic friction welded to a metal.

These and other objects, advantages and features of the invention will become apparent from the following description and accompanying drawing wherein.

Figure 1:
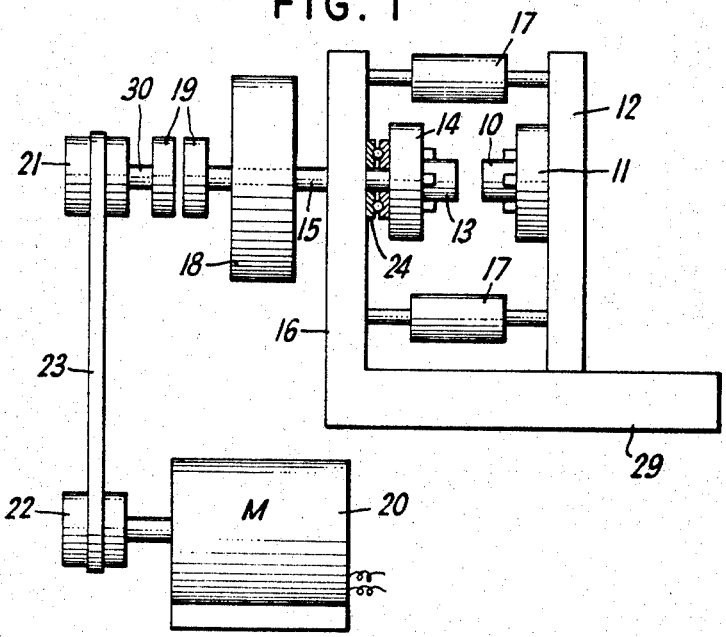
FIGURE 1 is a schematic drawing of a friction welding apparatus which may be used to friction weld a ceramic to a metal workpiece.

Referring to the drawing in detail, FIGURE 1 shows a first workpiece 10 secured in the stationary chuck 11 which is mounted on a movable frame member 12. A second workpiece 13 is held by the rotatably mounted chuck 14 which is fixed on the shaft 15. Shaft 15 extends through the stationary frame member 16. Frame members 12 and 16 extend upwardly from a base 29. Hydraulic cylinders 17 are connected between members 16 and 12 to draw them together. A thrust bearing 24 takes up the axial load from the rotating chuck 14.

Mounted on shaft 15 is a flywheel 18. Shaft 15 is driven through a clutch 19 from a shaft 30 by a motor 20 by means of a motor pulley 22 coupled to a pulley 21 on shaft 30 by a belt 23.

To friction weld a ceramic workpiece to a metal workpiece, either the ceramic or the metal workpiece may be mounted in either chuck 11 or 14. As one example, a ¾ inch diameter aluminum workpiece of 6061 T–6 aluminum alloy was welded to a ¾ inch diameter ceramic aluminum oxide rod. The workpiece 13 was rotated with a speed of 3,600 r.p.m. and the workpieces were forced together with a pressure of 500 pounds per square inch of weld area fo twenty seconds, at the end of which time the pressure ii the weld area was increased to 2,500 pounds per squar inch of weld area and the clutch 19 disengaged. The rela tively light flywheel 18, the chuck 14 and workpiece 1: came to a stop in less than one-half of a second to com plete the weld. While the aluminum oxide ceramic coul not melt at the temperature generated, it is believed tha molten metal flowed into the porous ceramic material t form the weld of this invention.

The initial pressure applied in the weld area may var from about 100 to 1,500 pounds per square inch. If les pressure is applied, sufficient heat is not generated t complete a weld. If the pressure greatly exceeds 1,50 pounds per square inch, there is a danger that the relativel brittle ceramic will crack and disintegrate during the weld ing process. After the initial pressure is applied to generat sufficient heat in the weld area, which requires at least . seconds and which with lighter pressures may take up t 60 seconds, a brake cannot be applied to stop shaft 15 a in conventional friction welding processes. If shaft 15 i stopped too rapidly, the ceramic workpiece will be shat tered. Thus it is desirable to choose a flywheel 18 which with shaft 15 and chuck 14, will have sufficient inertia t complete at least ten revolutions after clutch 19 is disen gaged. The pressure applied after clutch 19 is disengage to bring the relative rotation of the workpieces 10 and 1: to a stop need not be as high as 2,500 pounds per squar inch, but it should be high enough to bring the rotatio of workpiece 13 to a stop in less than about one secon to complete a satisfactory friction weld.

Figure 2:
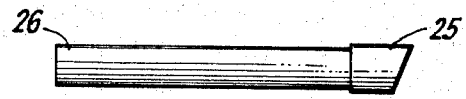
FIGURE 2 is a side view of a ceramic cutting tool friction welded to a metal rod.
Figure 3:
FIGURE 3 is a side view of a ceramic element friction welded to a metal rod.

As shown in FIGURE 2, a ceramic cutting tool 25 i shown friction welded to a metal tool holding rod 26 FIGURE 3 shows a metal rod 27 having a ceramic tip 2 which was friction welded to it.

While this invention has been disclosed in the best forn known, it will nevertheless be understood that this is pure ly exemplary and that modifications may be made withou departing from the spirit of the invention except as i may be more particularly limited in the appended claims

What is claimed is:
1. The method of friction welding a ceramic workpiec to a metal workpiece comprising the steps of rotating on of the workpieces relative to the other, forcing the work pieces together with a pressure of from about 100 to 1,50 pounds per square inch of weld area for from about fiv to sixty seconds, and then allowing the rotating workpiec to coast to a stop through at least ten revolutions and ii less than one second while continuing to force the work pieces together.

2. The method according to claim 1 wherein a cerami workpiece of aluminum oxide is friction welded to a meta workpiece of aluminum.

References Cited

UNITED STATES PATENTS

| 2,564,738 | 8/1951 | Tank | 29—497.5 X |
| 2,946,119 | 7/1960 | Jones et al. | 29—497.5 X |
| 2,956,611 | 10/1960 | Jendrisak et al. | 29—470.3 X |
| 3,134,169 | 5/1964 | Hollander et al. | 29—470.3 |
| 3,134,278 | 5/1964 | Hollander et al. | 29—470.3 |

OTHER REFERENCES

Modern Plastics: November 1945, pp. 142–145.

JOHN F. CAMPBELL, *Primary Examiner.*

R. F. DROPKIN, *Assistant Examiner.*

U.S. Cl. X.R.
29—472.9, 504; 156—73